UNITED STATES PATENT OFFICE.

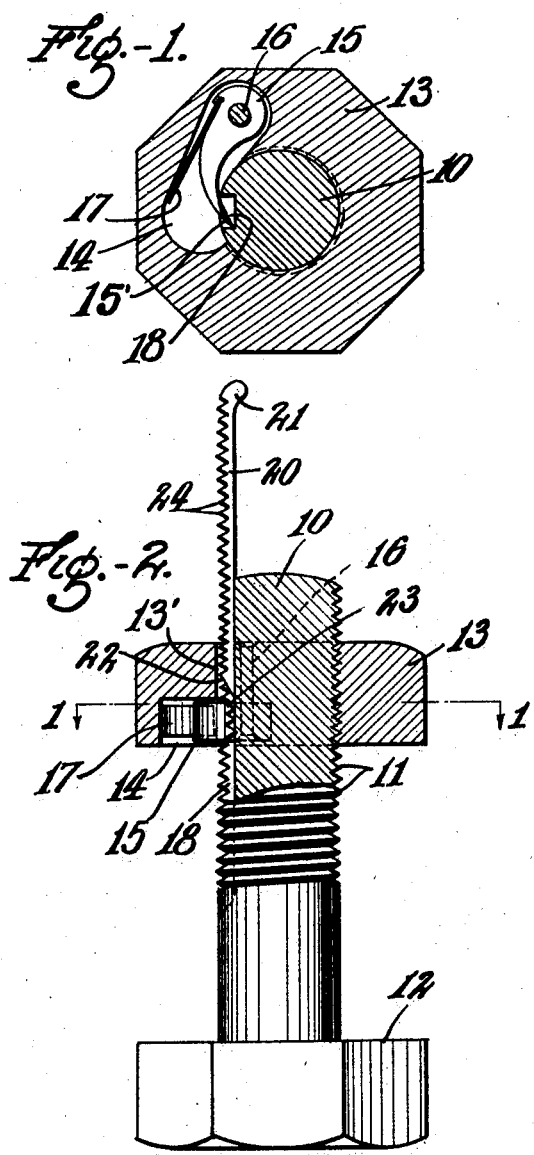

JÓZEF DZIKOSKI, OF WARRIOR RUN, PENNSYLVANIA.

NUT-LOCK.

1,388,937. Specification of Letters Patent. Patented Aug. 30, 1921.

Application filed January 22, 1921. Serial No. 439,078.

*To all whom it may concern:*

Be it known that I, Józef Dzikoski, citizen of Poland, residing at Warrior Run, in the county of Luzerne and State of Pennsylvania, have invented certain new and useful Improvements in Nut-Locks, of which the following is a specification.

This invention relates to nut-locks, and it has for an object to provide a simple and inexpensive form of nut-lock which will securely lock the nut against backward rotation on its bolt, while at the same time permitting ready withdrawal of the nut when desired.

For further comprehension of the invention, and of the objects and advantages thereof, reference will be had to the following description and accompanying drawings, and to the appended claims in which the various novel features of the invention are more particularly set forth.

Figure 1 of the drawings is a sectional view through a nut and bolt having the invention applied thereto, this view being taken on a plane at right angles to the axis of the nut on the line 1—1 of Fig. 2.

Fig. 2 is a longitudinal axial section through the nut and bolt, part of the latter being shown in elevation.

Fig. 3 is a detail perspective view of the releasing wedge.

Fig. 4 is a detail perspective view of the locking pawl.

In the drawings the reference numeral 10 indicates a bolt which is formed with the usual threads 11 and head 12. Upon this bolt is threaded the nut 13 provided with the usual interior thread.

Upon the inner face of this nut 13, or that adapted to engage the part being secured, is formed a recess 14 which communicates at one side with the opening or bore through the nut.

Within this recess 14 is pivoted a pawl 15 on an axis parallel to the bolt so as to swing transversely thereto, the pawl being here shown as pivoted on a pin 16 fixed in the nut.

The free end of the pawl 15 is normally pressed toward the bolt by means of a flat spring 17 fixed at one end to the pawl and bearing outwardly at its opposite end against the wall of the recess 14. The wall of the nut bore has a groove 13' cut therein from the outer face of the nut to the recess 14, this groove registering with the free end of the pawl.

Cut in the side of the bolt 10, longitudinally thereof, is a groove 18 while the free end of the pawl 15 has a lateral projection 15' which is adapted to engage in this groove, the face of this projection which is on the advancing side when the pawl is being carried around the bolt as the nut is screwed on the latter, being beveled as shown to permit of the pawl riding freely over the groove 18 during this movement. The opposite face of the projection is suitably cut to prevent return movement of the nut by abutting against the side of the groove 18.

To permit of ready removal of the nut when desired I provide a releasing member which is adapted to be inserted lengthwise in the grooves 13' and 18 and lift the pawl from engagement therewith. This releasing member comprises a key 20 of a shape to fit in these grooves 18 and 13' having an offset 21 at its outer end forming a handle, this offset being arranged to project over the bolt 10 when the key is in place so as to allow of the nut passing thereover.

The opposite end of the key is beveled off to wedge shape as at 22 in the longitudinal line of the bolt, while the projection 15' on the pawl permits of insertion of the key 20 thereunder to lift the projection from the groove.

Upon the side of key 20 which faces outwardly when the key is in releasing position are found a series of thread elements 24 while on the inner face of the pawl end 15' are formed thread elements 25, these thread elements 24 and 25 being of a pitch corresponding to that of the bolt threads, while the thread elements 25 are properly alined with the nut threads. As will be apparent, the pawl 15 will hold the nut 13 securely against unscrewing movement. When it is desired to remove the nut, the key 20 is inserted into the groove 18 until the wedge end 22 lifts the pawl from the groove and the adjacent thread elements 24 thereon engage the thread elements 25 on the pawl.

The nut may then be readily unscrewed, the pawl projection 15' riding past the groove 18 which is filled by the key.

Having thus described my invention what

I claim as new and desire to protect by Letters Patent of the United States is as follows:—

1. A releasing means for a nut-lock having a pawl carried by the nut and engaging in a groove in the bolt, consisting of a key adapted to fit into said groove and lift said pawl, said key having serrations on its outer face complementary to the threads of the bolt.

2. A releasing means for a nut-lock having a pawl carried by the nut and engaging in a groove in the bolt, consisting of a key adapted to fit into said groove and lift said pawl, said key having serrations on its outer face complementary to the threads of the bolt.

3. In a nut-lock, a nut having a recess formed on its inner face, said recess communicating at one side with the bore of the nut, a bolt having a longitudinal groove in the side thereof, a pawl, pivoted in said recess and having a laterally offset end, a spring pressing said laterally offset end of the pawl into the said groove, said offset end being beveled in the longitudinal line of the bolt, for the purpose set forth.

In testimony whereof I have affixed my signature.

JÓZEF DZIKOSKI.